(12) United States Patent
Arnold

(10) Patent No.: US 6,219,257 B1
(45) Date of Patent: Apr. 17, 2001

(54) INTEGRATED BATTERY COMPARTMENT AND HINGE

(75) Inventor: Thomas A. Arnold, Aliso Viejo, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/073,725

(22) Filed: May 7, 1998

(51) Int. Cl.[7] ........................................... H05K 7/10
(52) U.S. Cl. ..................... 361/814; 455/556; 361/726
(58) Field of Search .................... 361/814, 683, 361/684, 726; 455/556

(56) References Cited

U.S. PATENT DOCUMENTS

| 5,293,300 | * | 3/1994 | Leung | 361/683 |
| 5,583,744 | * | 12/1996 | Oguchi et al. | 361/683 |
| 5,606,730 | * | 2/1997 | Rush et al. | 455/90 |
| 5,924,044 | * | 7/1999 | Vannatta et al. | 455/556 |
| 5,955,700 | * | 9/1999 | Slipy et al. | 361/726 |

* cited by examiner

*Primary Examiner*—Leo P. Picard
*Assistant Examiner*—Hung Van Duong
(74) *Attorney, Agent, or Firm*—Knobbe, Martens, Olson & Bear, LLP.

(57) ABSTRACT

The present invention relates to a portable folding communication device comprising a top portion, a bottom portion, and a cylindrical hinge connecting the top and bottom portions. The cylindrical hinge houses an integrated battery compartment. In a preferred embodiment, the device uses a rechargeable AA lithium ion cell, which can be inserted from one end of the cylindrical hinge.

25 Claims, 4 Drawing Sheets

INTEGRATED BATTERY COMPARTMENT AND HINGE

BACKGROUND OF THE INVENTION

1. Field of the Invention

The present invention relates generally to electrical devices. Specifically, the present invention relates to improvements in battery compartment configurations for electrical devices.

2. Brief Description of the Related Art

As portable electronic devices become smaller, lighter and more common, there is a need to minimize the size and cost of such devices without compromising the usefulness of the device. This is particularly true of portable communication devices. For example, single body phones require a minimum length to retain the minimum distance between the ear and mouth of the user. Flexible or "folding" phones allow smaller size while maintaining proper distance between the microphone and speaker. However, folding phones present a problem of where to position the battery compartment while maintaining the small size and weight of the phone.

SUMMARY OF THE INVENTION

Portable folding phones have battery compartments in either the top or bottom portion of a two-part phone. Both of these configurations require the body of the phone to be a certain size to accommodate the battery used. In other words, both of these configurations add thickness and weight to the half of the phone where the battery resides. The placement of the circuit board, LCD, keypad, speaker and other parts add further design limitations. Another constraint is the use of custom batteries. Current portable folding phones use irregular or prismatic battery cells, which are expensive.

The present invention provides improvements for portable folding phones. The present invention involves an integrated battery compartment in the hinge of a portable folding communication device. The present invention reduces the size and weight of a portable folding communication device. In a preferred embodiment, the present invention uses a standard cylindrical battery, which is less expensive and is more widely available than irregular or prismatic cells. Accordingly, the cost is also reduced.

In general, the present invention comprises a first portion having at least one speaker and a second portion having at least one microphone. The first portion is coupled to the second portion with a hinge, which allows the first and second portions to fold around the hinge. The hinge also houses a battery compartment.

In a preferred embodiment, the battery compartment is substantially cylindrical in shape to accept at least one AA battery cell or an AA lithium ion battery cell. In another embodiment, the battery compartment is shaped to accommodate at least one AAA battery cell or AAA lithium ion battery cell.

In another preferred embodiment, the present invention further comprises a hinged door at least one end of the hinge for installing and replacing a battery. In one embodiment the hinged door contains contacts for completing a circuit for which the battery provides power.

In another preferred embodiment, the hinge is formed from two or more outer hinge portions coupled to the first portion and at least one central hinge portion coupled to said second portion. In one embodiment, the outer hinge portions and the at least one central hinge portion cooperate to form a substantially cylindrical hinge shaped to accept at least one cylindrical battery.

DETAILED DESCRIPTION OF THE PREFERRED EMBODIMENT

Figure 1:
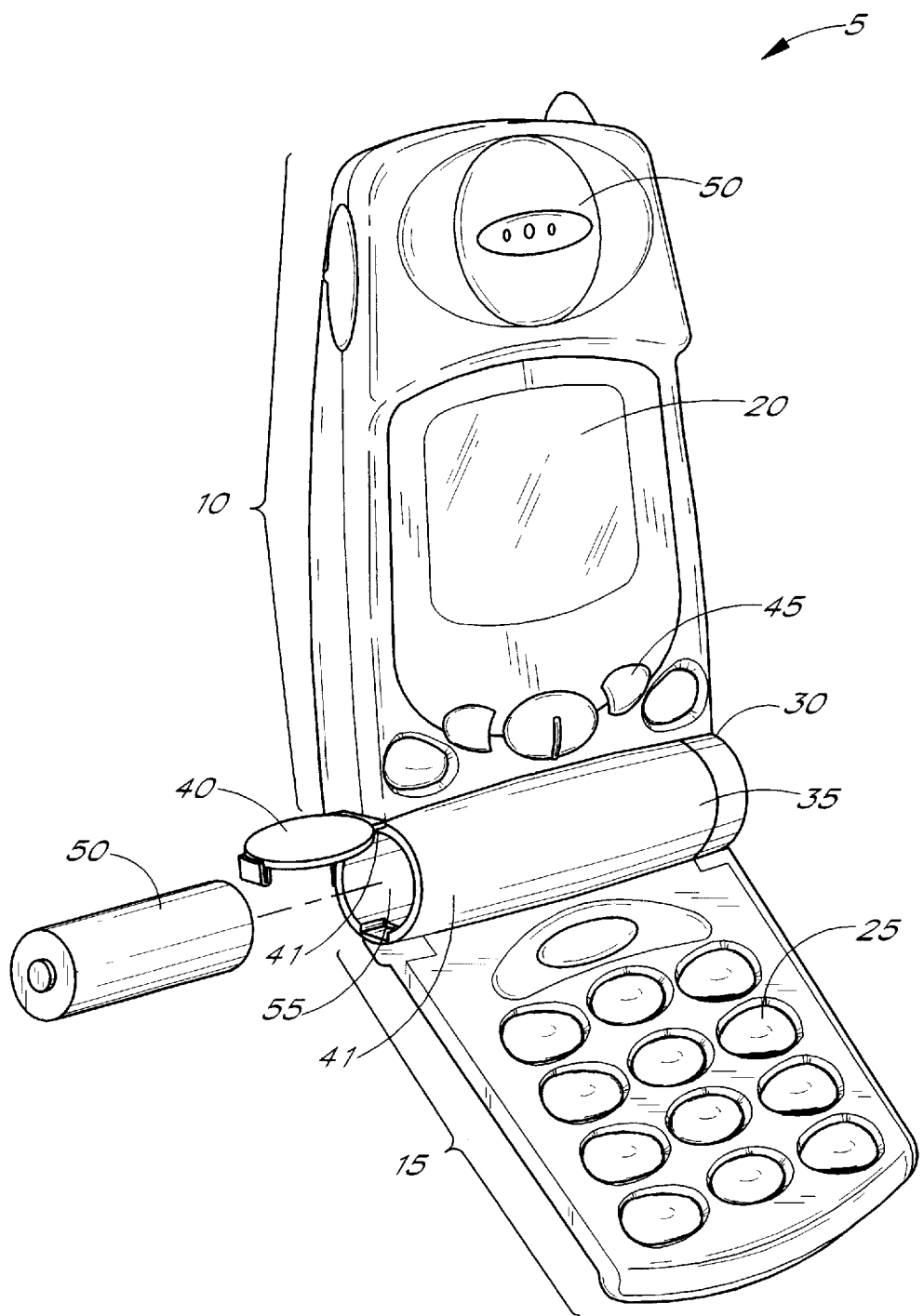
FIG. 1 illustrates a portable folding communication device in accordance with the present invention.

The present invention involves an integrated battery compartment as the central pivot in the hinge of a portable folding communication device. FIG. 1 illustrates a folding phone in accordance with the present invention. The top half 10 of the phone 5 preferably includes a LCD display 20, a speaker 50 and various control and menu keys 45. The bottom half 15 of the phone 5 preferably includes a main keypad 25 with number keys and other control and menu keys. Those of ordinary skill in the art will appreciate that the position of these components may be arranged in a variety of ways. The top half 10 and the bottom half 15 operatively pivot around a hinge 30 from a closed or folded position to a open or deployed position.

As depicted in FIG. 1, the hinge 30 houses an integrated battery compartment 35 and pivots around the battery compartment 35. The battery compartment 35 is preferably cylindrical. A battery 50 may be installed and replaced from an aperture 55 on one side of the hinge 30. A cap 40 on the side of the hinge 30 keeps the battery 40 in place during operation. In one embodiment, the cap 40 contains conductive metallic leads to complete the circuit with the battery 50 as the power supply. The door 40 is preferably hinged onto the side of the hinge 30. The device may further comprise a locking mechanism to secure the door 40 and prevent the battery 50 from sliding out inadvertently. In another embodiment, the integrated battery compartment 35 may have an aperture located on the back of the hinge 30 or on the back of one of the phone halves 10, 15.

Figure 2:
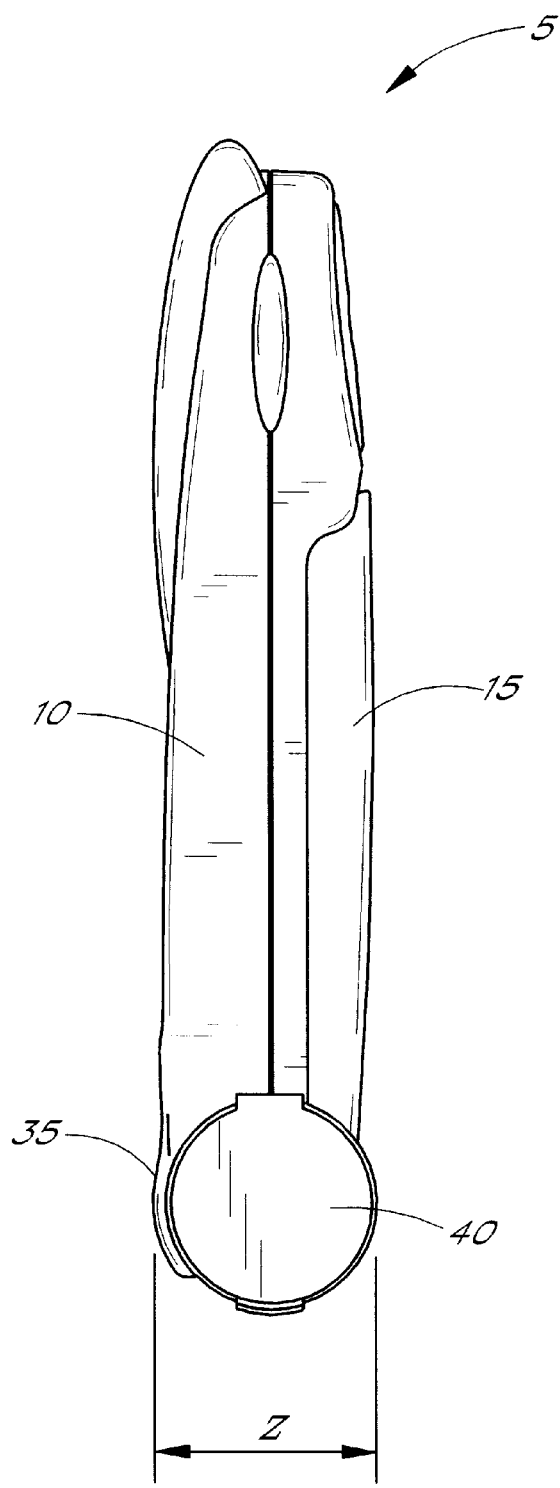
FIG. 2 is a side view of the device of FIG. 1.

FIG. 2 is a side view of the device of FIG. 1. FIG. 2 shows that the minimal thickness of the overall portable folding phone 5, as measured along line 2—2, is only limited by the thickness of the hinge and battery compartment 35. The battery compartment 35, in turn, is only limited by the diameter of the particular battery used by the phone. This significantly reduces the overall size of the device as compared to other portable folding communication devices. The present invention allows the circuit board, LCD, keypad, speaker and other parts of the device to be positioned in the top or bottom halves of the phone without interference from the battery compartment. The entire top and bottom halves of the folding phone may be used for electronics. Additional circuit board footprint is available with the same size battery as compared to cell phone designs with prismatic batteries. Manufacturing costs may be reduced by using less expensive circuit board options for a given small form factor.

Figure 3:
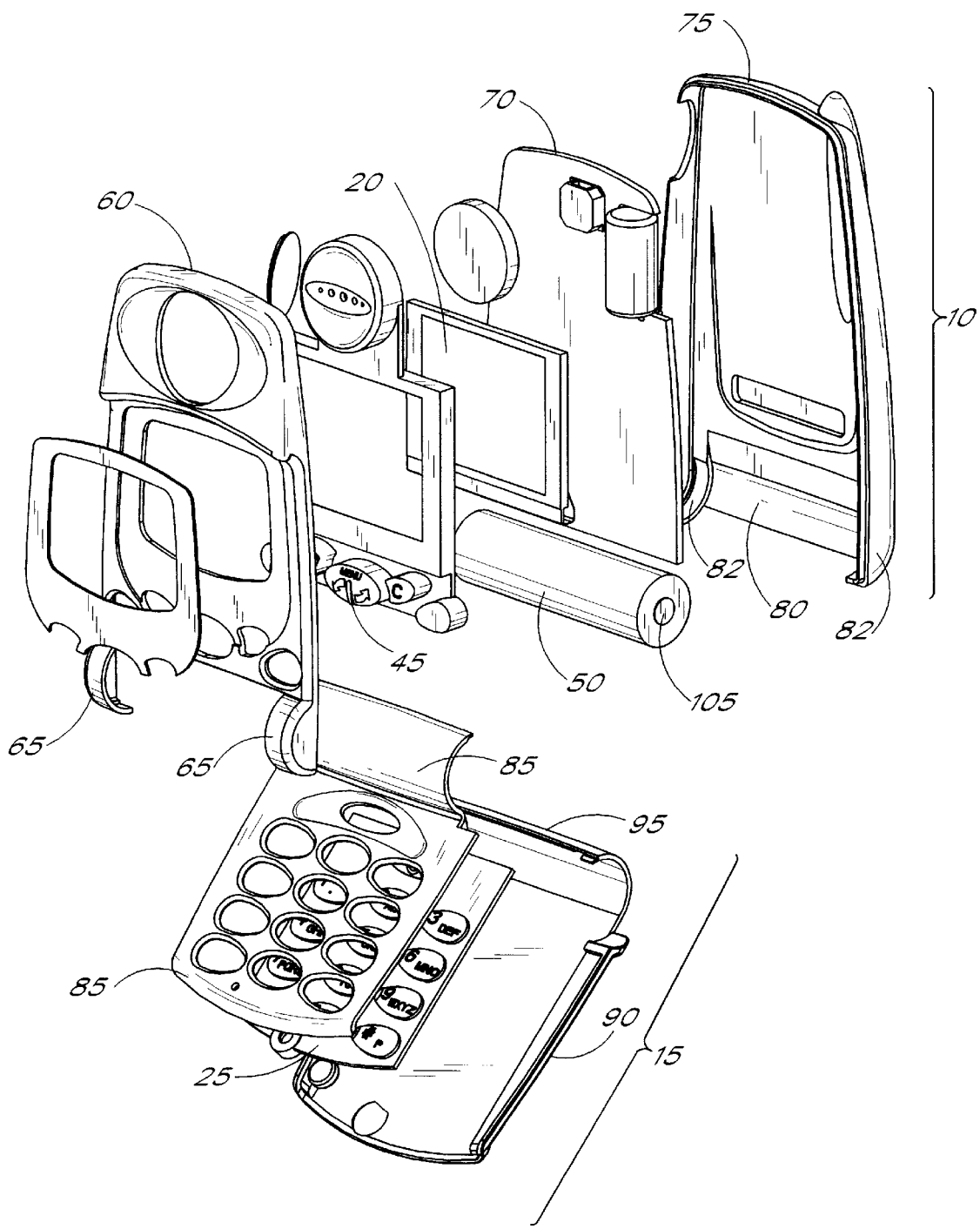
FIG. 3 is an exploded cross-sectional view of the device of FIG. 1.

FIG. 3 is an exploded cross-sectional view of the device of FIG. 1. As shown in FIG. 3, the top half 10 of the folding phone 5 comprises a front housing 60, a control key keypad 45, an LCD display 20, a circuit board 70 and a rear housing 75. The bottom half 15 of the folding phone comprises a front housing 85, a main keypad 25 and a rear housing 90.

In one embodiment, the control keys keypad 45 and the main keypad 25 may be made from flexible membranes (not shown), as disclosed by U.S. patent application Ser. No. 09/073,724, entitled "Enhanced Keypad Control For Portable Communication Device" filed concurrently with the present application and incorporated by reference herein. This reduces the cost of manufacturing the keypads.

The bottom half 15 of the folding phone may include a circuit board (not shown) and/or a switch pad (not shown) underneath the keypad 25. In this embodiment, the circuit board 70 of the top half 10 and the circuit board of the bottom half 15 may be connected by a flexible electrical connector, as disclosed by U.S. patent application Ser. No. 09/073,724, entitled "Enhanced Keypad Control For Portable Communication Device". The flexible connector wraps around through the hinge 30 between the two halves of the phone 5.

As shown in FIG. 3, the battery compartment 35 has several parts: the two outer hinge ends 65 of the top front housing 60, the outer hinge portion 80 of the top rear housing 75, the central hinge portion 85 of the bottom front housing 85 and the central hinge portion 95 of the bottom rear housing 90. The outer hinge ends 65 of the top front housing 60 are adapted to conform to the ends 105 of the cylindrical battery 50. The surface of the ends 105 are conductive or have conductive leads which transfer power supplied by the battery 50 to the circuit board 70 in the top half 10 of the phone 5. In a preferred embodiment, where the battery 50 is removable, one of the outer hinge ends 65 of the front housing 60 is removable and forms the hinged door 40, as shown in FIG. 1. The distal portion of the top rear housing 75 is preferably molded to accommodate this hinged door.

The cylindrically-shaped outer hinge portion 80 of the top rear housing 75 also has outer hinge ends 82. The outer hinge portion 80 with its hinge ends 82 cooperate with the outer hinge portions 65 to house the body of a battery 50. The partial cylindrically-shaped central hinge portion 100 of the bottom rear housing 90 also cooperates with the central hinge portion 95 to form substantially a cylinder to contain battery 50 and complete the hinge. When assembled, the central hinge portions 95, 85 slidably receive the battery 50, and the outer hinge portions 80 of the top rear housing 75 slidably receive the central hinge portions 95, 85. Thus, the central hinge portion 95, 85 slidably rotates within the outer hinge portion 80 (enclosed by the outer hinge ends 65) to enable the two-part phone to fold. This is also shown in FIG. 4, which is a cross-sectional side view of the device of FIG. 3.

Figure 4:
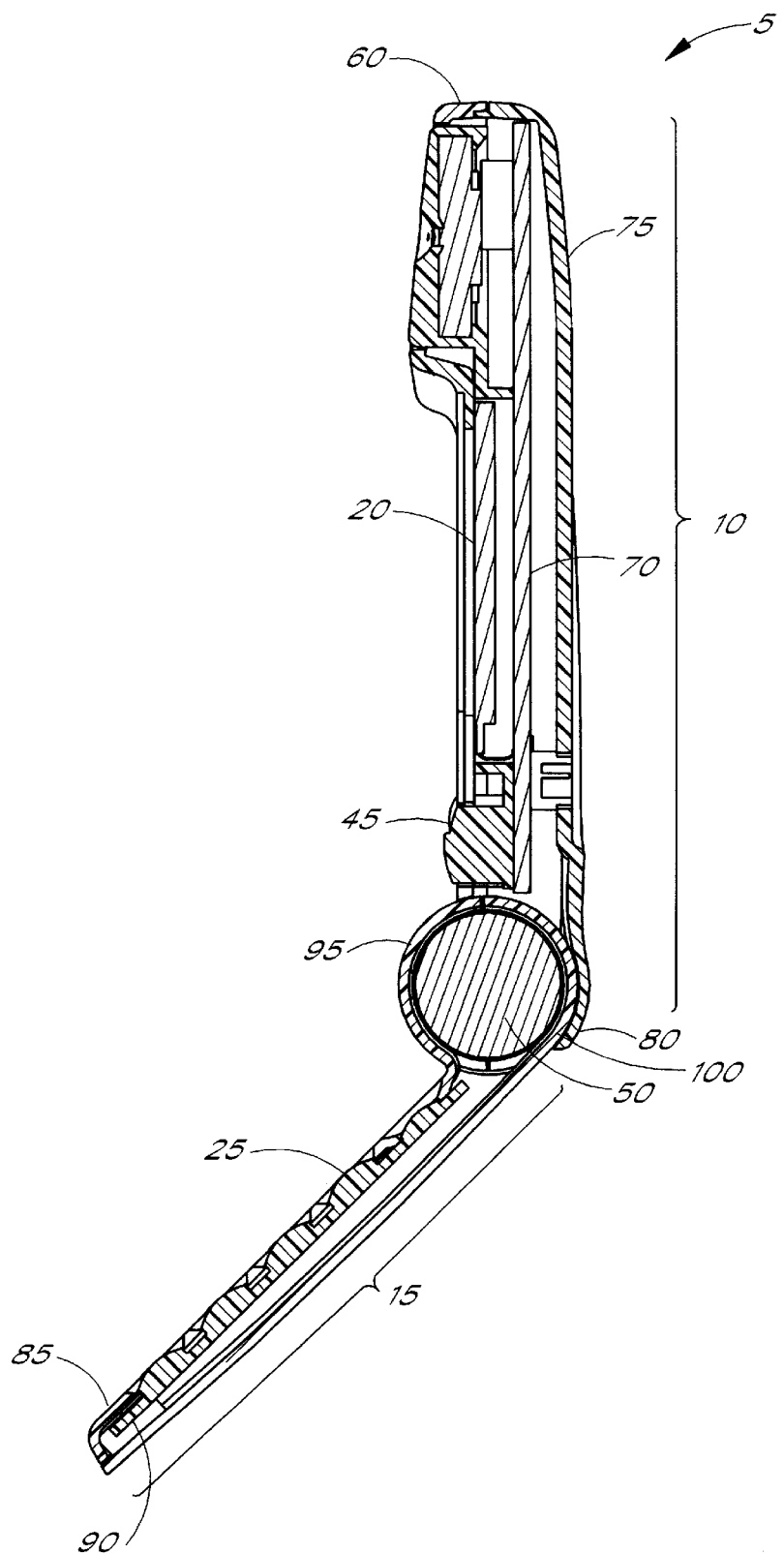
FIG. 4 is a cross-sectional side view of the device of FIG. 1.

As shown in FIG. 4, the central hinge portions 95, 85, cooperate to form substantially a cylinder when assembled. Furthermore, the outer hinge portion 80 of the top portion of the phone cooperates to conform to the outer surface of the central hinge portions 95, 85. The outer hinge ends 65 with corresponding hinge ends 82 cooperate to prevent the hinge from slipping apart.

In a preferred embodiment, the device uses a cylindrical battery 50, preferably an AA lithium ion cell. AA lithium ion cells are light, reliable, widely available. They may be recharged before and after use. Lithium batteries tend to provide a longer 'talk time' and can be recharged a greater number of times than other batteries currently used in portable phones because the lithium ion batteries do not have memory and do not deteriorate like Nickel Cadmium batteries. Cylindrical batteries are also less expensive than irregular or prismatic cells. In one embodiment, the device uses an AAA lithium ion cell. In still another embodiment, the battery may be rechargeable but not removable. Indeed, for lithium ion cells, the cylindrical battery 50 is preferable not removable, because lithium ion cells are explosive when subjected to cross-circuits.

Although the present invention is described here as used in portable phones, it may be appreciated by one of ordinary skill in the art that the present invention may be applicable to other portable devices. Such devices may include calculators, computers, cameras, visual displays, and audio devices.

What is claimed is:

1. A portable wireless communication device comprising:
a first portion containing at least one speaker;
a second portion coupled to said first portion with a hinge, said first portion and second portion foldable at said hinge, said second portion having at least one microphone;
a battery compartment within said hinge.

2. The portable wireless communication device of claim 1 wherein the battery compartment is substantially cylindrical in shape.

3. The portable wireless communication device of claim 1, further comprising a removable end cap at least one end of the hinge for installing and replacing a battery.

4. The portable wireless communication device of claim 1, wherein said hinge is formed from outer hinge portions coupled to said first portion and at least one central hinge portion coupled to said second portion.

5. The portable wireless communication device of claim 2, wherein said battery compartment is shaped to accept at least one AA battery cell.

6. The portable wireless communication device of claim 2, wherein said hinge contains at least one AA lithium ion battery cell.

7. The portable wireless communication device of claim 2, wherein the battery compartment is shaped to accommodate at least one AAA battery cell.

8. The portable wireless communication device of claim 7, wherein the battery compartment contain at least one AAA lithium ion battery cell.

9. The portable wireless communication device of claim 3, wherein the removable end cap contains contacts for completing a circuit for which the battery provides power.

10. The portable wireless communication device of claim 4, wherein said outer hinge portions and said at least one central hinge portion cooperate to form a substantially cylindrical hinge shaped to accept at least one cylindrical battery.

11. A portable wireless telephone comprising:
a top portion having at least one speaker;
a bottom portion having at least one microphone;
a hinge coupling said top and bottom portions, said hinge forming a battery compartment within said hinge.

12. The portable wireless communication device of claim 11 wherein the battery compartment is substantially cylindrical in shape.

13. The portable wireless communication device of claim 11, further comprising a removable end cap at least one end of the hinge for installing and replacing a battery.

14. The portable wireless communication device of claim 11, wherein said hinge is formed from outer hinge portions coupled to said first portion and at least one central hinge portion coupled to said second portions.

15. The portable wireless communication device of claim 11, wherein said top portion comprises a display, a speaker, and outer hinge portions.

16. The portable wireless communication device of claim 1, wherein said battery compartment comprises electrical leads which connect to said battery and couple said battery to a circuit to be powered by said battery.

17. The portable wireless communication device of claim 12, wherein said battery compartment is shaped to accept at least one AA battery cell.

18. The portable wireless communication device of claim 12, wherein said hinge contains at least one AA lithium ion battery cell.

19. The portable wireless communication device of claim 12, wherein the battery compartment is shaped to accommodate at least one AAA cell.

20. The portable wireless communication device of claim 19, wherein the battery compartment contain at least one AAA lithium ion battery cell.

21. The portable wireless communication device of claim 13, wherein the hinged door contains contacts for completing a circuit for which the battery provides power.

22. The portable wireless communication device of claim 14, wherein said outer hinge portions and said at least one central hinge portion cooperate to form a substantially cylindrical hinge shaped to accept at least one cylindrical battery.

23. A portable wireless communication device comprising:

a top portion having a display, a speaker, and at least one outer hinge portion;

a bottom portion having a keypad, microphone, and at least one central hinge portion;

a hinge formed from said at least one outer hinge portion and central hinge portion, said hinge forming a battery compartment within said hinge.

24. The portable wireless communication device of claim 23, wherein said central hinge portion cooperates with said outer hinge portions to form a substantially cylindrical hinge to form said battery compartment.

25. The portable wireless communication device of claim 24, further comprising at least one hinged door attached to at least one end of said substantially cylindrical hinge, said hinge cap providing access to said battery compartment.

* * * * *